Patented Nov. 15, 1949

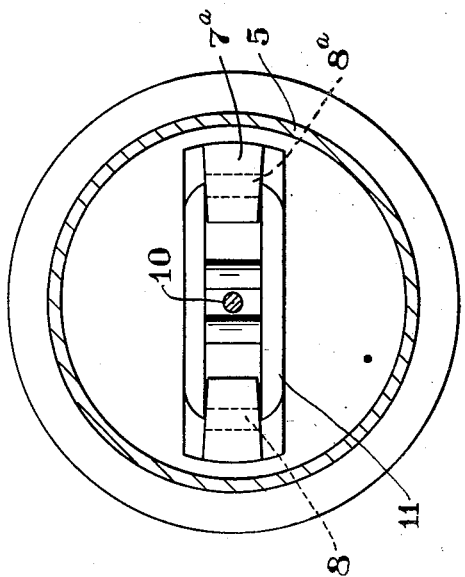
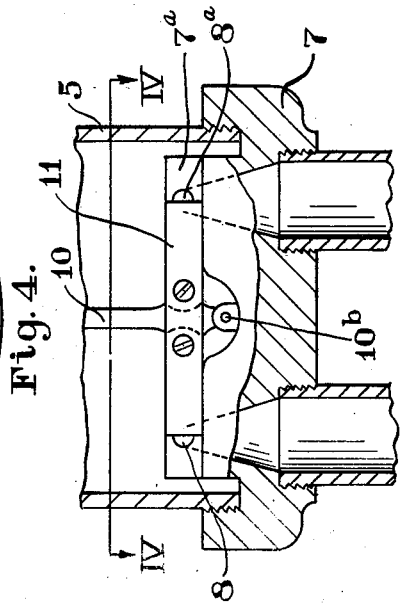
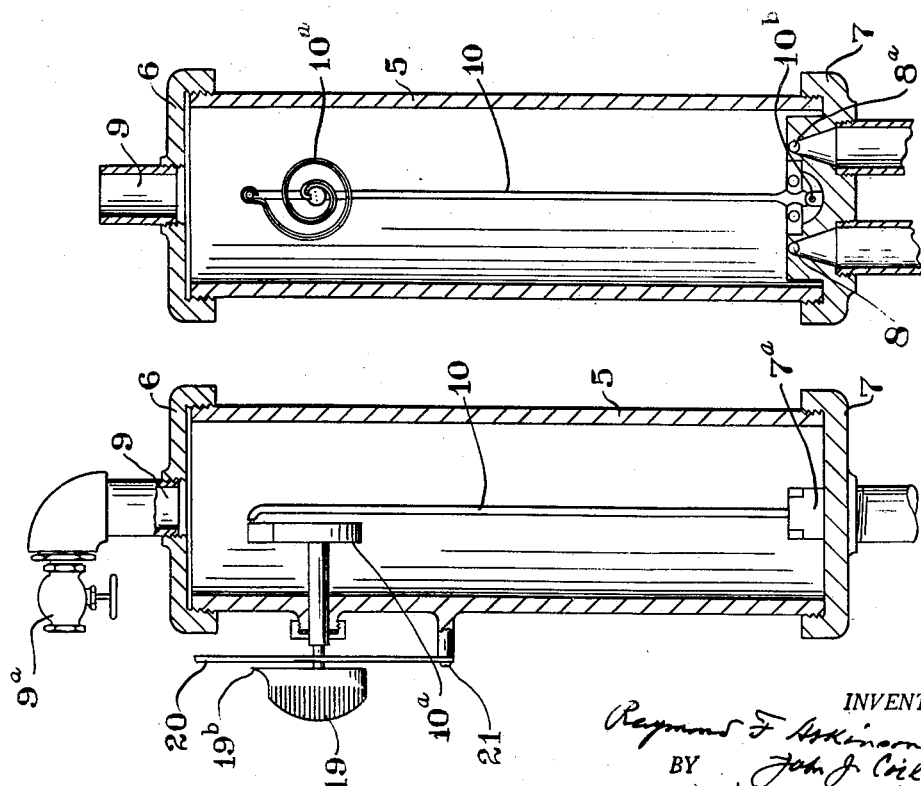

2,488,048

UNITED STATES PATENT OFFICE 2,488,048

AUTOMATIC WATER TEMPERATURE CONTROL

Raymond F. Atkinson, Mount Vernon, and John J. Coile, Newark, Ohio

Application November 19, 1946, Serial No. 710,832

1 Claim. (Cl. 236—12)

This invention relates generally to thermostatically controlled means and is designed more particularly for controlling and regulating the temperature of water used in shower or tub baths but is useful for any domestic or commercial purpose where hot and cold water or other liquids are to be mixed and discharged or used at a desired and substantially uniform temperature.

In the plumbing of modern dwellings and buildings the pressure of the hot and cold water are usually substantially equal, hence by properly proportioning the quantities discharged into a vessel or tub any desired resulting intermediate temperature can be obtained. Therefore when the thermostatic element with other elements as herein described are preliminarily set for the mixed water to be used, the resulting temperature thereof is automatically regulated and maintained by the behavior of the thermostatic element because of the tendency of that element to respond to fortuitous or accidental variation in the temperature of one of the waters.

The object of the present invention is to provide an improved simple and economical construction as compared with that of U. S. Letters Patent No. 2,287,294 whereby the results indicated can be achieved.

In its preferred form the present invention is embodied as shown in the accompanying drawing in which:

Fig. 1 is mainly a central vertical section viewed from the right hand side of the device.

Fig. 2 is generally a central vertical section at right angles to that of Fig. 1, the discharge control valve at the top shown in Fig. 1, being omitted.

Fig. 3 is an enlarged vertical section of the lower end of the means.

Fig. 4 is a horizontal section on the line IV—IV Fig. 3 looking down.

In the views the character 5 designates a cylindrical casing having a top cap and a bottom cap 7. The characters 8 and 8ª designate horizontal water inlets on the bottom closure that designated 8 in the instance shown, being for the introduction of ordinary cold water to the casing 5 while that designated 8ª is for the introduction of hot water to the casing. The open discharging ends of the pipes 8 and 8ª are spaced apart but are horizontally parallel with each other for the purpose hereinafter appearing. The outlet 9 for the mixed water is conveniently located in the top cap and said outlet can be provided with an ordinary stop cock 9ª as shown in Fig. 1.

The character 10 designates a rod pivotally connected at its upper end with one end of a coiled spring 10ª and at its lower end to a suitable bearing 10ᵇ in the bottom of the casing.

The base lower closing member 7 of the casing or tank is provided with opposite ribs 7ª having the horizontal water passages, one 8 for cold water and the other 8ª for the hot water, and integral with or secured on said base are separated projections with the upward projections having the said horizontal passages 8 and 8ª. The said projections control 7ª have a slight taper toward the middle to insure water tight fitting and the varying of the said passages by means of a slidable closure 11.

The desired temperature of water to be obtained is fixed by proportioning the relative inflows of hot and cold water as set forth in the former patent referred to. The purpose of the construction is to vary the flow of the waters into the casing according to the position of said lever 10.

By reason of the construction as shown and the consequent distance of the thermostat from the intakes the action of the water on the thermostatic element is much more uniform and sensitively effective in its operation on and control of the valves. Because of the distance of the upward flow of the two waters due to the length of the vessel the waters become more quickly and thoroughly mixed to a uniform temperature by the time they reach the neighborhood of the said thermostatic element 10ª.

The thermostatic element is indicated at 10 and 10ª, it being of the usual thermostatic bimetal in the form of a volute 10ª and having the end of its inner coil fixed at one end of a shaft, the other end of which latter extends through a suitable bushing to the exterior of the casing where it is provided with a finger actuated button 19 formed with a pointer 19ᵇ. The said finger button and its pointer cooperate with a plate 20 fixed at 21 on the casing, said plate being marked with a scale as shown in the former patent herein referred to and indicating or suggesting (when the pointer is set) the desired temperature of the water to be obtained or to be discharged through the outlet 9. This detail of construction is similar to that shown in the U. S. patent referred to.

The end of the outer or larger coil 10ª of the thermostat is bent to extend into and engage the upper end of the lever 10 and by turning finger button 19 to the right or left, the pressure of the coil is varied and can be left temporarily fixed to secure a mixture of cold and hot water of the temperature desired.

The forms and number of the parts can be changed and parts omitted without departing from the gist of the invention as claimed.

What we claim is:

A mixing device comprising a vertically extended casing, a bottom inlet member for the casing, internal projections integral with the bottom member and provided with laterally extending fluid passages, a valve member embracing opposite sides of said projections and slidable thereon for controlling the passage of fluid through said passages, a thermostatic element within the casing adjacent the upper end thereof, a bearing on the bottom member between said projections, a lever connecting the thermostat and sliding valve member and pivotally attached to said bearing, said lever being actuated by the thermostat to control the movement of the sliding valve member.

RAYMOND F. ATKINSON.
JOHN J. COILE.

REFERENCES CITED

The following references are of record in the file of this patent:

UNITED STATES PATENTS

| Number | Name | Date |
|---|---|---|
| 1,845,499 | Henneuse | Feb. 16, 1932 |
| 1,957,276 | Leonard | May 1, 1934 |
| 2,175,203 | Leonard | Oct. 10, 1939 |
| 2,211,481 | Scott | Aug. 13, 1940 |
| 2,287,294 | Coile et al. | June 23, 1942 |